(12) United States Patent
Hsu et al.

(10) Patent No.: US 8,129,462 B2
(45) Date of Patent: Mar. 6, 2012

(54) HIGH TEMPERATURE LINER

(75) Inventors: Tim Hsu, State College, PA (US); John Joseph Dodds, Trafford, PA (US)

(73) Assignees: Robroy Industries, Inc., Verona, PA (US); Polymics, Ltd., State College, PA (US)

( * ) Notice: Subject to any disclaimer, the term of this patent is extended or adjusted under 35 U.S.C. 154(b) by 1091 days.

(21) Appl. No.: 10/524,897

(22) PCT Filed: Aug. 19, 2003

(86) PCT No.: PCT/US03/26058
§ 371 (c)(1),
(2), (4) Date: Apr. 26, 2006

(87) PCT Pub. No.: WO2004/016419
PCT Pub. Date: Feb. 26, 2004

(65) Prior Publication Data
US 2006/0229395 A1    Oct. 12, 2006

(51) Int. Cl.
*B60C 1/00* (2006.01)
*C08K 3/00* (2006.01)

(52) U.S. Cl. ........ 524/494; 524/186; 524/191; 524/284; 524/315; 524/425; 524/449; 524/462; 524/495; 524/497; 524/500

(58) Field of Classification Search .................. 524/186, 524/191, 284, 315, 425, 449, 462, 494, 495, 524/497, 500
See application file for complete search history.

(56) References Cited

U.S. PATENT DOCUMENTS

| | | | |
|---|---|---|---|
| 4,785,057 | A | 11/1988 | Shiiki et al. |
| 4,824,256 | A | 4/1989 | Häring et al. |
| 5,177,137 | A | 1/1993 | Kawashima et al. |
| 5,401,799 | A | 3/1995 | Kohlhepp et al. |
| 5,511,619 | A | 4/1996 | Jackson |
| 5,698,235 | A | 12/1997 | Satoh et al. |
| 5,798,077 | A | 8/1998 | Womer et al. |
| 5,889,102 | A | 3/1999 | Haack et al. |
| 5,900,453 | A | 5/1999 | Egami et al. |
| 5,947,593 | A | 9/1999 | Inoue et al. |
| 6,013,719 | A * | 1/2000 | Lahijani ........................ 524/508 |
| 6,042,260 | A | 3/2000 | Heidemeyer et al. |
| 6,048,088 | A | 4/2000 | Häring et al. |
| 6,179,460 | B1 | 1/2001 | Burkhardt et al. |
| 6,227,692 | B1 | 5/2001 | Heathe |
| 6,419,864 | B1 | 7/2002 | Scheuring et al. |

* cited by examiner

*Primary Examiner* — Cephia D Toomer
(74) *Attorney, Agent, or Firm* — The Webb Law Firm

(57) ABSTRACT

The present invention is directed to an extrudable resin composition and a method of extruding the extrudable resin composition, comprising a high temperature engineering thermoplastic, one or more reinforcement components, an enhancing filler component, a polymeric lubricant, and an external lubricant, wherein the extrudable resin composition is capable of withstanding temperatures up to about 427° C. The invention is further directed to the use of the extruded pipes and/or lined pipes, produced according to the present method, in downhole tubular applications in oil and gas production; in line pipe, flow line, and transportation line applications in oil and gas production and supply operations; or in most any application where corrosive protection is required to transmit or store corrosive fluids, particularly at high temperatures.

31 Claims, 3 Drawing Sheets

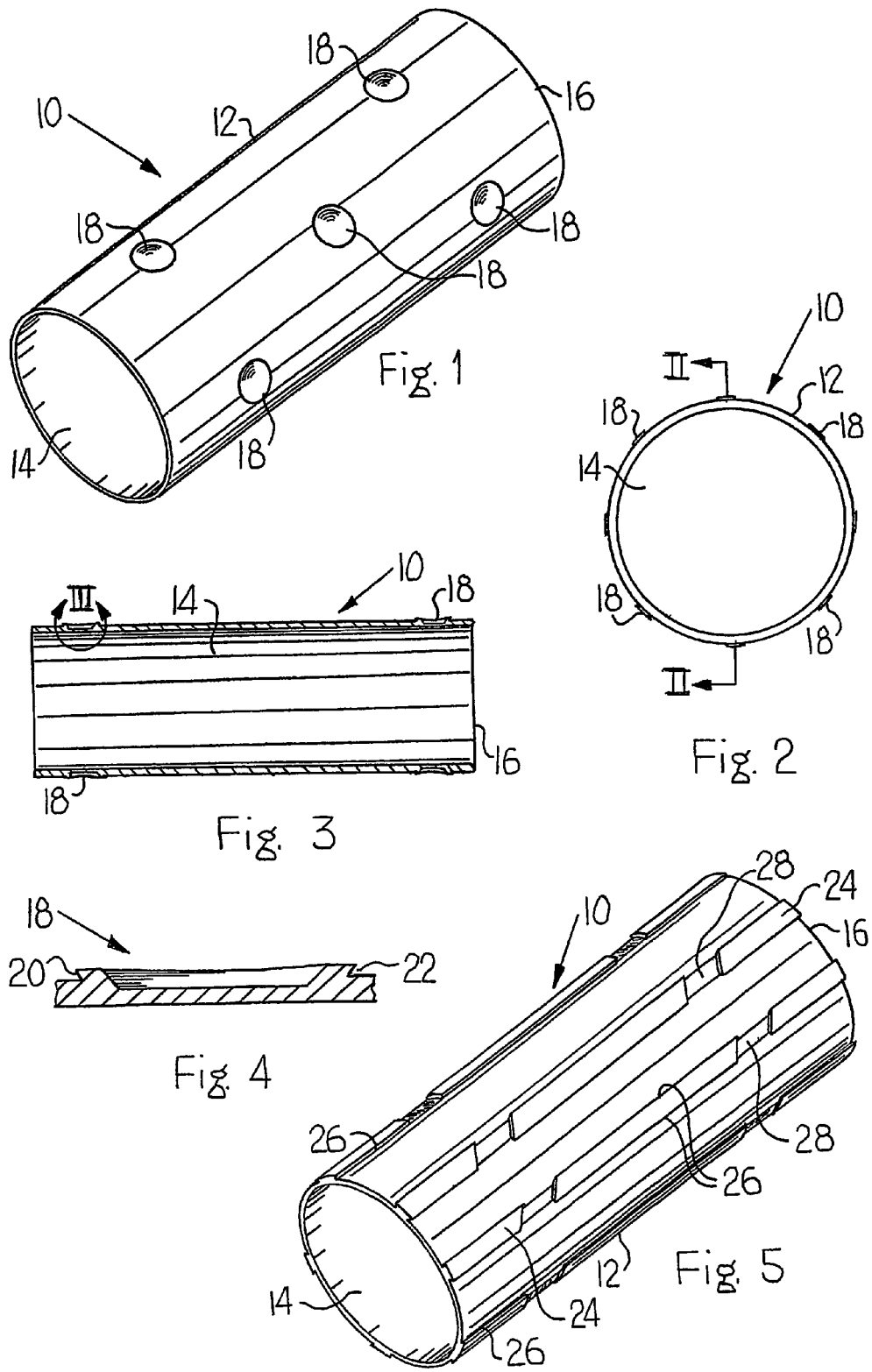

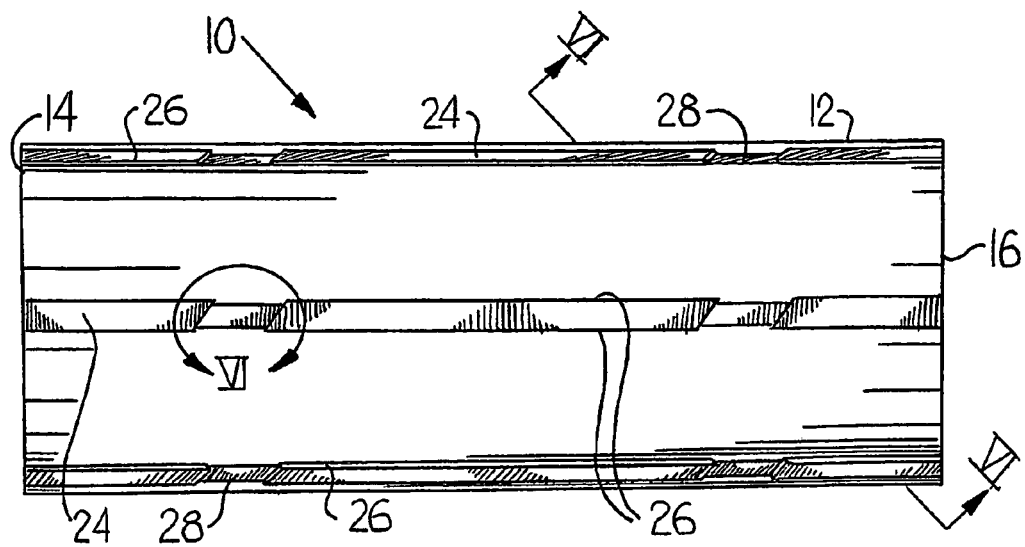
Fig. 6
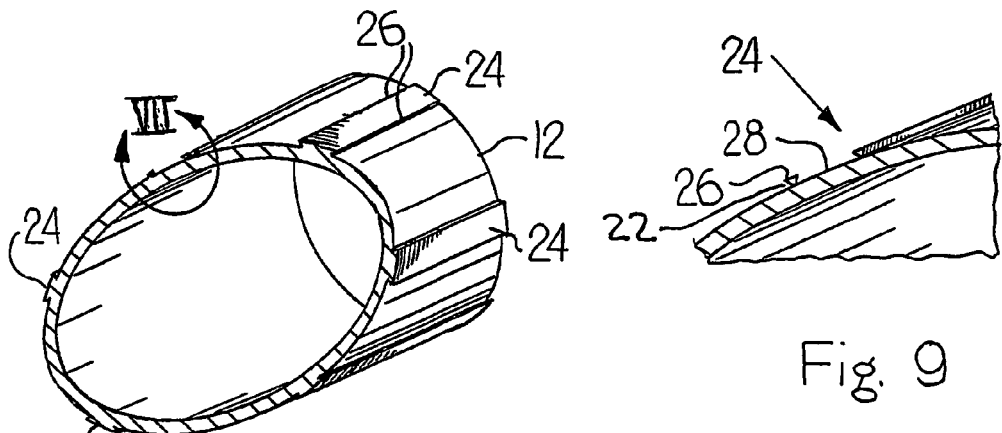
Fig. 7
Fig. 9
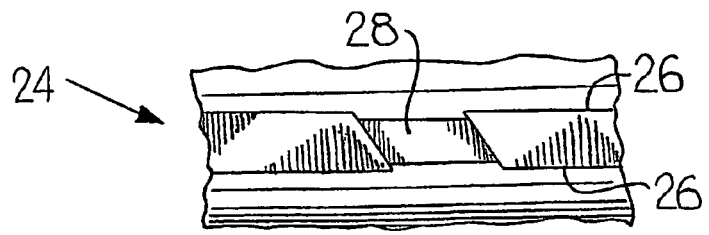
Fig. 8

HIGH TEMPERATURE LINER

BACKGROUND OF THE INVENTION

1. Field of the Invention

The present invention relates to a compounded resin and the use of such compounded resin compositions to form extruded tubes, such as those used to line metal tubes in downhole tubular applications during oil and gas production, as well as in line pipe, flow line, and transportation line applications during oil and gas production and supply operations.

2. Description of Related Art

Typical oilfield tubulars are produced from steel and corrosion resistant alloys or materials. During production, injection, and disposal well operations, the tubulars are exposed to hydrocarbon fluids and gases which contain brine water, hydrogen sulfide, and carbon dioxide. The combinations of fluids and gases transmitted by oilfield tubulars under extreme temperatures and pressures create a variety of caustic and corrosive conditions that attack and corrode tubular goods. One solution to prevent corrosion of oilfield steel tubulars is to coat the inside of the tubular with a plastic layer or other corrosion resistant coating.

An alternative to prevent corrosion of oilfield tubulars is to insert a corrosion resistant liner into the steel tubular. Such liners may be made of polyvinyl chloride (PVC), polyethylene (PE), glass fiber reinforced epoxy resin (GRE), or other reinforced polymer resins. Typically, these liners are up to 45 feet long and have an outside diameter sized to tightly fit within the inside diameter of the steel tubulars or to loosely fit creating an annulus, which is subsequently grouted. The PVC and PE liners are limited in their use because they cannot withstand elevated temperatures.

GRE liners, which can withstand elevated temperatures are formed from glass filaments coated with resin and wound into the liner. In a typical filament winding process to produce GRE liners, a plurality of glass filaments (for example, 1,000-2,000 in number) is aligned into a single roving. A plurality of rovings is passed through a bath containing a curable resin composition and exits the bath coated with resin. A pan containing the resin bath is located on a carriage that moves laterally along the axis of a horizontally positioned steel pipe acting as a production mandrel. The resin coated rovings are wound over the preheated production mandrel. The winding is accomplished by rotating the mandrel and moving a carriage which dispenses several resin coated rovings from end-to-end of the mandrel so that the rovings are laid down in a criss-cross pattern. The angle that the rovings make with a vertical line is controlled to attain hoop strength and axial strength. The rovings are laid side-by-side from end-to-end along the mandrel to cover the mandrel and produce a coating of GRE thereon. The placement of the rovings from one end to another and back again is referred to in this manufacturing process as one circuit. The resulting liner is made by performing a specific number of circuits. When the winding is complete, the GRE resin system is cured by heating the mandrel. After the resin is cured, the mandrel is allowed to cool and retract from the GRE liner. The GRE liner is removed from the mandrel, and the resin is post-cured (i.e., in a curing oven) so that the liner attains the desired physical properties and is ready for use as a liner in a steel oilfield tubular. Conventional GRE liners can withstand temperatures in typical downhole production or injection service to about 121° C.

Recently, oilfield drilling has reached depths of 20,000 feet or more below the surface of the earth. At such deep levels, the bottom hole temperature may be as high as 218-232° C. At these depths, the resin in conventional GRE liners is known to fail in combination with the corrosives in the downhole environment. Although thicker fiberglass reinforced resin liners can overcome some of the problems experienced in deep well production, it is desirable to maintain the walls of such liners as thin as possible to maximize the volume of fluids or gases which pass through the steel tubulars.

Accordingly, a need remains for an oilfield tubular liner that can withstand temperatures and corrosive exposure above 121° C.; in fact, some applications may require continuous temperatures as high as 260° C. or greater. Additionally, the tubular liner should be made of materials or compounds that are able to perform or be compatible in the use environment without degradation in mechanical and thermal performance. In other words, the tubular liner must be able to resist environmental stress failure, which can be a complicated interaction of mechanical, thermal, and chemical properties of the material.

There remains a need for a resin composition that can be extruded in sufficient lengths to form dimensionally strong liners for use in high temperature tubular applications. Such liners should be able to withstand exposure to extreme temperatures and protect metal tubulars against corrosion.

SUMMARY OF THE INVENTION

The present invention is directed to an extrudable resin composition that includes a high temperature engineering thermoplastic compounded with one or more of a reinforcement component, an enhancing filler component, a polymeric lubricant, and an external lubricant.

The present invention is further directed to a method of extruding the present extrudable resin composition, whereby the extrudable resin composition is fed to a suitable extruder at a temperature of up to about 427° C.

The present invention is also directed to extruded pipe made using the present method of extrusion as well as the inclusion of such extruded pipe in lined steel pipe.

The present invention is still further directed to the use of the extruded pipe and/or the lined steel pipe in downhole tubular applications in oil and gas production, as well as in line pipe, flow line, and transportation line applications in oil and gas production and supply operations.

BRIEF DESCRIPTION OF THE DRAWINGS

FIG. 1 is a front perspective view of the high temperature liner with tabs as anchor members.

FIG. 2 is a front view of the high temperature liner with tabs as anchor members.

FIG. 3 is a longitudinal view taken along line II-II of FIG. 2 of the high temperature liner with tabs as anchor members.

FIG. 4 is a cross-sectional view taken along area III of FIG. 3.

FIG. 5 is a front perspective of the high temperature liner with ribs as anchor members.

FIG. 6 is a longitudinal view of the high temperature liner with ribs as anchor members.

FIG. 7 is a cross-sectional view taken along line VI-VI of FIG. 6 of the high temperature liner with ribs as anchor members.

FIG. 8 is a view taken perpendicular to area VI of FIG. 6 of the high temperature liner with ribs as anchor members.

FIG. 9 is a cross-sectional view taken along area VII of FIG. 7 of the high temperature liner with ribs as anchor members.

DETAILED DESCRIPTION OF THE INVENTION

Figure 10:
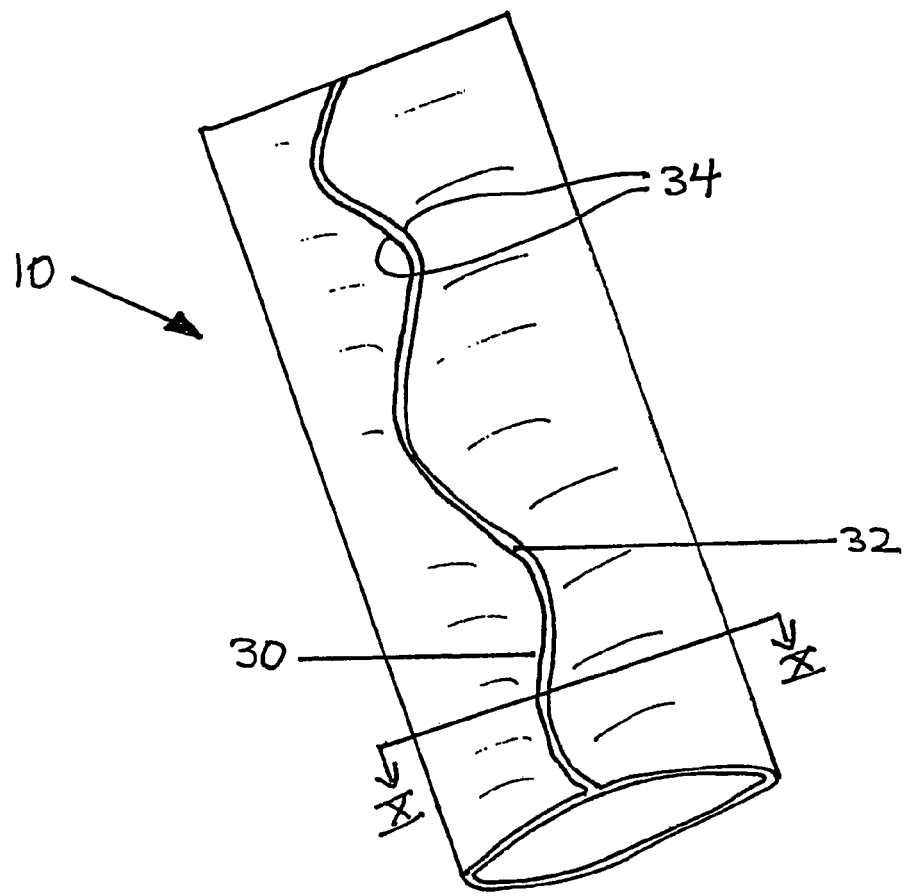
FIG. 10 is a front perspective of the high temperature liner with one groove anchor member shown.

Other than in the operating examples, or where otherwise indicated, all numbers or expressions referring to quantities of ingredients, processing conditions, etc. used in the specification are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "high temperature engineering thermoplastic" is meant to refer to thermoplastic materials and compounded compositions containing such thermoplastic materials that are able to maintain their form and function at temperatures up to 232° C. or higher. By "form and function" what is meant is the structural or protective property or attribute that one material provides to another material.

As used herein, the term "reinforcement component" is meant to refer to suitable materials that may be added to and/or compounded with a thermoplastic material to provide desirable properties, such as, but not limited to, structural and/or dimensional stability. Suitable materials that may be used as reinforcement components include, but are not limited to, inorganic fibers, glass fibers, carbon fibers, graphite, ceramic fibers, and polymeric fibers.

As used herein, the term "enhancing filler component" is meant to refer to suitable materials that may be added to and/or compounded with a thermoplastic material to provide desirable properties, such as, but not limited to, randomizing the orientation of reinforcement components during extruding operations, as well as minimizing and/or preventing the formation of voids in compounded thermoplastic compositions during extrusion operations. Examples of suitable enhancing filler components include, but are not limited to, titanium dioxide, barium sulfate, silica, alumina, talc, mica, kaolin, clay, silica-alumina, calcium carbonate, calcium silicate, calcium phosphate, calcium sulfate, magnesium carbonate, magnesium oxide, zinc oxide, magnesium phosphate, silicon nitride, glass, hydrotalcite, and zirconium oxide.

As used herein, the term "polymeric lubricant" is meant to refer to suitable materials that may be added to and/or compounded with a thermoplastic material to provide desirable properties, such as, but not limited to, internal lubrication and surface lubrication to reduce drag during extrusion operations. In liners produced from the present extrudable resin composition, the polymeric lubricant may provide a smoother surface with a lower surface coefficient of friction compared to liners that do not include the polymeric lubricant. The smoother surface and reduced coefficient of friction allows for lower surface drag, which may result in lower pumping pressures during operation. Suitable polymeric lubricants include, but are not limited to, fluoropolymers, such as homopolymers and copolymers, that include monomers, such as tetrafluoroethylene, trifluoroethylene, vinylidene fluoride, chlorotrifluoroethylene, fluorinated alkyl esters of (meth)acrylic acid, and mixtures thereof.

As used herein, the term "external lubricant" is meant to refer to suitable materials that may be added to and/or compounded with a thermoplastic material to provide desirable properties, such as, but not limited to, reducing die drool and surface lubrication to reduce drag during extrusion operations. Suitable external lubricants include, but are not limited to, fatty acids and their corresponding amides, esters, and salts, organic phosphate esters, and hydrocarbon waxes. Suitable fatty acids include, but are not limited to, myristic acid, palmitic acid, stearic acid, arachic acid, montanic acid, octadecenoic acid, and parinaric acid. Suitable fatty acid esters include, but are not limited to, fatty acids esterified with one or more hydroxyl containing compounds selected from the group consisting of glycerol, ethylene glycol, propylene glycol, pentaerythritol, and $C_1$ to $C_{24}$ alkylols. Suitable fatty acid amides include, but are not limited to, fatty acids that have undergone an amidation reaction with one or more amine containing compounds selected from the group consisting of $C_1$ to $C_{24}$ primary amines, $C_1$ to $C_{24}$ secondary amines, methylene bisamines, ethylene bisamines, and alkanolamines. Suitable fatty acid salts include, but are not limited to, fatty acid salts of an ion selected from Group IIA metals such as calcium and magnesium, and transition metals, such as zinc and cadmium. Suitable hydrocarbon waxes include, but are not limited to, paraffin waxes, polyolefin waxes, oxidized polyolefin waxes, and microcrystalline waxes.

As used herein, the term "alkylols" refers to any hydrocarbon that contains at least one hydroxyl group.

As used herein, the term "thermally stable" refers to the ability of a composition to maintain its physical integrity, i.e., its form and function, at a particular temperature range.

As used herein, the term "tubular" refers to a long hollow cylinder for holding or carrying gasses or liquids.

As used herein, the term "liner" refers to a substantially cylindrical object with an outside diameter less than the inside diameter of a tubular.

As used herein, the term "disruption member" refers to a protrusion from the outer surface of a wall of a liner.

In the present invention, an extrudable resin composition is prepared, which includes a high temperature engineering thermoplastic compounded with and/or containing fillers selected from one or more of a reinforcement component, an enhancing filler component, a polymeric lubricant, and an external lubricant. The present extrudable resin composition may be consistently processed into pipes, liners, or similar shapes, using standard thermoplastic extrusion equipment without major modification and may be used, i.e., is thermally stable, at temperatures to 316° C. or higher. The present extrudable resin composition meets the requirements for various applications that require high use temperatures (typically 66° C. to 260° C.), has excellent chemical resistance (for example, against high concentrations of hydrocarbon, sulfur compound, and other chemical additives present in gas or liquid forms), and has suitable mechanical properties, such as tensile strength, compressive strength, and impact strength.

The high temperature engineering thermoplastic is present in the extrudable resin composition at a level of at least 50 wt. %, in some cases at least 53 wt. %, in other cases at least 55 wt. %, in some situations at least 60 wt. %, in other situations at least 65 wt. %, and in some compositions at least 70 wt. % of the extrudable resin composition. The high temperature engineering thermoplastic is present in the extrudable resin composition in an amount sufficient to provide protection against corrosion and deterioration of the extruded tube during use. Further, the high temperature engineering thermoplastic is present in the extrudable resin composition at a level of up to 99.9 wt. %, in some cases up to 99.7 wt. %, in some situations up to 99.5 wt. %, in other situations up to 99 wt. %, in some compositions up to 95 wt. %, and in other compositions up to 90 wt. % of the extrudable resin composition. The amount of high temperature engineering thermoplastic in the extrudable resin composition may be limited based on the presence of other additives that provide desirable properties to the extrudable resin composition. The amount of the high temperature engineering thermoplastic in the extrudable resin composition may vary between any of the levels recited above.

The extrudable resin composition may include a reinforcement component therein. When a reinforcement component is included, it may be present in the extrudable resin composition at a level of at least 0.1 wt. %, in some cases at least 0.25 wt. %, in other cases at least 0.5 wt. %, in some situations at least 1 wt. %, in other situations at least 2 wt. %, and in some compositions at least 5 wt. % of the extrudable resin composition. When the level of reinforcement component is too low in the extrudable resin composition, a resulting extruded tube may have inadequate structural and/or dimensional stability. Further, the reinforcement component is present in the extrudable resin composition at a level of up to 40 wt. %, often up to 35 wt. %, at times up to 30 wt. %, in some cases up to 25 wt. %, in some situations up to 20 wt. %, in other situations up to 17.5 wt. %, in some compositions up to 15 wt. %, and in other compositions up to 10 wt. % of the extrudable resin composition. If the amount of reinforcement component in the extrudable resin composition is too high, a resulting extruded tube may not extrude properly. The amount of reinforcement component in the extrudable resin composition may vary between any of the levels recited above.

The extrudable resin composition may include an enhancing filler component therein. When an enhancing filler component is included, it may be present in the extrudable resin composition at a level of at least 0.01 wt. %, in some cases at least 0.1 wt. %, in other cases at least 0.25 wt. %, in some situations at least 0.5 wt. %, in other situations at least 1 wt. %, and in some compositions at least 5 wt. % of the extrudable resin composition. When the level of enhancing filler component is too low in the extrudable resin composition, any reinforcement component may not be adequately randomized, leading to reinforcement component alignment predominately in the direction of extrusion and poor structural and dimensional strength in the direction perpendicular to the direction of extrusion. Also, when the level of enhancing filler component is too low in the extrudable resin composition, voids may form in the compounded thermoplastic compositions during extrusion operations. Further, the enhancing filler component is present in the extrudable resin composition at a level of up to 10 wt. %, in some cases up to 9 wt. %, in some situations up to 8 wt. %, in other situations up to 7 wt. %, in some compositions up to 6 wt. %, and in other compositions up to 5 wt. % of the extrudable resin composition. If the amount of enhancing filler component in the extrudable resin composition is too high, a resulting extruded tube may not extrude properly. The amount of enhancing filler component in the extrudable resin composition may vary between any of the levels recited above.

The extrudable resin composition may include a polymeric lubricant therein. When a polymeric lubricant is included, it may be present in the extrudable resin composition at a level of at least 0.001 wt. %, in some cases at least 0.01 wt. %, in other cases at least 0.1 wt. %, in some situations at least 0.25 wt. %, in other situations at least 0.5 wt. %, and in some compositions at least 1 wt. % of the extrudable resin composition. When the level of polymeric lubricant is too low in the extrudable resin composition, an extrusion may require excessive energy and pressure. Further, the polymeric lubricant is present in the extrudable resin composition at a level of up to 5 wt. %, in some cases up to 4.5 wt. %, in some situations up to 4 wt. %, in other situations up to 3.5 wt. %, in some compositions up to 3 wt. %, and in other compositions up to 2 wt. % of the extrudable resin composition. If the amount of polymeric lubricant in the extrudable resin composition is too high, the extrudable resin composition may become too expensive for economical use in its intended application. The amount of polymeric lubricant in the extrudable resin composition may vary between any of the levels recited above.

The extrudable resin composition may include an external lubricant therein. When an external lubricant is included, it may be present in the extrudable resin composition at a level of at least 0.001 wt. %, in some cases at least 0.01 wt. %, in other cases at least 0.1 wt. %, in some situations at least 0.2 wt. %, in other situations at least 0.25 wt. %, and in some compositions at least 0.3 wt. % of the extrudable resin composition. When the level of external lubricant is too low in the extrudable resin composition, an extrusion may require excessive energy and pressure. Further, the external lubricant is present in the extrudable resin composition at a level of up to 2 wt. %, in some cases up to 1.9 wt. %, in some situations up to 1.75 wt. %, in other situations up to 1.5 wt. %, in some compositions up to 1.25 wt. %, and in other compositions up to 1 wt. % of the extrudable resin composition. If the amount of external lubricant in the extrudable resin composition is too high, a resulting extruded tube may not extrude properly. The amount of external lubricant in the extrudable resin composition may vary between any of the levels recited above.

The high temperature engineering thermoplastic is typically a thermoplastic polymer with good chemical resistance and reasonable mechanical and thermal properties. The high temperature engineering thermoplastic is melt-processable, resistant to common chemicals and solvents, such as sulfur containing compounds, oil and gas, and has a heat deflection temperature (HDT) or softening point higher than 82° C., often higher than 93° C., typically higher than 104° C., and in some cases higher than 121° C.

Any suitable high temperature engineering thermoplastic may be used in the present invention. Suitable high temperature engineering thermoplastics include, but are not limited to, polyarylketones, such as polyether ether ketones (PEEK), polyether ketones (PEK), and polyether ketone ketones (PEKK); polyphenylene sulfides (PPS); polyarylene sulfides; chemical resistant polysulfones (PSU); polyphenyl sulfones (PPSu); polyether sulfones (PES); and polyolefins, such as homopolymers and copolymers of propylene and ethylene.

Non-limiting examples of suitable PEEK and PEK materials include those available from Victrex, plc, Rotherham, South Yorkshire, United Kingdom. Non-limiting examples of suitable PEKK materials include those available from Cytec Fiberite, Tempe, Ariz. Non-limiting examples of suitable PPS materials include those available from the Ticona Division of Celanese AG, Frankfurt, Germany. Non-limiting examples of suitable PSU materials include those available under the trade names UDEL and MINDEL from Solvay, SA, Brussels, Belgium. Non-limiting examples of suitable PPSu and PES materials include those available under the trade name RADEL from Solvay.

In an embodiment of the present invention, the high temperature engineering thermoplastic is one or more polyphenylene sulfides, the reinforcement component is glass fiber, the enhancing filler component is titanium dioxide, the polymeric lubricant is poly(tetrafluoroethylene) (PTFE), and the external lubricant is selected from calcium stearate, zinc stearate, palmitic acid amides, stearic acid amides, oleic acid amides and N,N'-ethylenebisstearamide.

In another embodiment of the present invention, the high temperature engineering thermoplastic is one or more polyphenylene sulfides or PEKK/PEEK compounds, the polymeric lubricant is PTFE, and the enhancing filler component is a mineral filler. Suitable mineral fillers include, without limitation, magnesium oxides. The mineral filler may be present in the extrudable resin composition at a level of at least 5 wt. %, in some cases at least 10 wt. %, in other cases at least 15 wt. %, and in some situations at least 20 wt. % of the extrudable resin composition. Further, the mineral filler may be present in the extrudable resin composition at a level of up to 40 wt. %, in some cases up to 35 wt. %, in some situations up to 30 wt. %, and in other situations up to 25 wt. % of the extrudable resin composition. The amount of the mineral filler in the extrudable resin composition may vary between any of the levels recited above. The PTFE may be present in the extrudable resin composition at a level of 0 wt. %, in some cases at least 4 wt. %, in other cases at least 8 wt. %, and in some situations at least 12 wt. % of the extrudable resin composition. Further, the mineral filler may be present in the extrudable resin composition at a level of up to 30 wt. %, in some cases up to 25 wt. %, in some situations up to 20 wt. %, and in other situations up to 15 wt. % of the extrudable resin composition. The amount of PTFE in the extrudable resin composition may vary between any of the levels recited above. The high temperature engineering thermoplastic has the advantage of being highly extrudable with much reinforcement.

The high temperature engineering thermoplastic is typically suitable for extrusion having a manageable viscosity when melted. As a non-limiting example, the melt index (MI) or melt flow rate of the high temperature engineering thermoplastic may be used as a measure of melt viscosity. In a non-limiting example, the high temperature engineering thermoplastic may be a polyaryl ketone, such as PEEK, PEK, and PEKK, or extrudable resin composition thereof, and the MI may be up to 200 g/10 min., in some cases up to 175 g/10 min., in other cases up to 150 g/10 min., and in some situations up to 100 g/10 min., or lower measured at 204° C. and 8.4 Kg. Further, the melt index (MI) or melt flow rate of the high temperature engineering thermoplastic or extrudable resin composition thereof may be 10 g/10 min., in some cases 20 g/10 min., in other cases 25 g/10 min., in some situations 35 g/10 min., and in other situations 50 g/10 min. measured at 204° C. and 8.4 Kg. In a further non-limiting example, the high temperature engineering thermoplastic may be PPS, in which case the MI may be up to 200 g/10 min., in some cases up to 175 g/10 min., in other cases up to 150 g/10 min., and in some situations up to 100 g/10 min. or lower measured at 320° C. and 3.7 Kg. Additionally, the melt index (MI) or melt flow rate of PPS or extrudable resin composition thereof may be 10 g/10 min., in some cases 20 g/10 min., in other cases 25 g/10 min., in some situations 35 g/10 min., and in other situations 50 g/10 min. measured at 320° C. and 3.7 Kg. The MI of the high temperature engineering thermoplastic or extrudable resin composition thereof may vary between any of the values recited above. The MI is measured by determining the amount of material flow after the material has been maintained at a given temperature for 6 minutes and a weight placed on the material thereafter. As a non-limiting example, MI may be determined using ASTM D-1238.

Alternatively, the MI may be measured, as a non-limiting example, at 6 minute and 30 minute intervals when the high temperature engineering thermoplastic is a polyaryl ketone. The ratio of the 6 minute MI to the 30 minute MI is termed the 6/30 MI ratio. The 6/30 MI ratio may be 0.1, in some cases 0.25, in other cases 0.5, and in other cases 0.75, and, in a presently preferred embodiment, 1. Typically, it is desirable that the 6/30 MI ratio be as close to 1 as possible. As a further alternative, the MI may be measured, as a non-limiting example, at 6 minute and 15 minute intervals when the high temperature engineering thermoplastic is PPS. The ratio of the 6 minute MI to the 15 minute MI is termed the 6/15 MI ratio. The 6/15 MI ratio may be 0.1, in some cases 0.25, in other cases 0.5, and in other cases 0.75, and, in a presently preferred embodiment, 1. Typically, it is desirable that the 6/15 MI ratio be as close to 1 as possible. The MI ratios may range between any of the values recited above.

The high temperature engineering thermoplastic will also have sufficient temperature stability during extrusion so as to provide an extruded liner with consistent wall thickness.

The extrudable resin composition of the present invention is typically compounded. As used herein, the terms "compounded" and "compounding" refer to compositions where the ingredient used in the largest amount is a polymeric material and other materials or fillers are added in fixed proportions such that the other materials are uniformly dispersed, incorporated, dissolved, and/or reacted with the polymeric materials. Polymeric materials include, but are not limited to, high temperature engineering thermoplastics, natural and synthetic rubbers, plastics, and silicon-based polymers.

Prior to compounding, the components of the extrudable resin composition may be dried. Any suitable means of drying may be used, non-limiting examples of which include air drying, oven drying, vacuum drying, flash drying, freeze drying, spray drying, and combinations thereof.

As stated above, the compounding step includes an intensive blending of two or more of the components of the extrudable resin composition. Typically, a high shear, high intensity blender can be used to pre-blend the extrudable resin composition components. Components of the compounded extrudable resin composition may be blended by tumble blend methods.

After blending, various blended components are fed to an extruder by way of feeders. Any suitable feeder may be used in the present invention. Examples of suitable feeders include, but are not limited to, volumetric feeders and gravimetric feeders.

Any suitable extruder may be used in the present invention. In an embodiment of the present invention, the extruder is a twin screw extruder. Suitable twin screw extruders include, but are not limited to, the ZSK, CONTINUA, and MEGA COOKER EXTRUDER models available from Coperion Werner & Pfleiderer, Konstanz, Germany, the ZSE line of extruders available from American Leistritz Extruder Corp., Somerville, N.J., Yellow Jacket Co-rotating Intermeshing Twin Screw Extruders available from Wayne Machine & Die Company, Totowa, N.J.; and the Century CX Series twin-screw compounding extruder available from Century Extruders, Traverse City, Mich. Additionally, twin screw extruders and their operation, which may be used in the present invention, are disclosed in U.S. Pat. No. 6,042,260 to Heidemeyer et al.; U.S. Pat. No. 6,048,088 to Häring et al.; and U.S. Pat. No. 6,419,864 to Scheuring et al., all of which are herein incorporated by reference. Proper dispersion is optimized through screw design selection in the extruder.

The extruder used in the present invention may have one or two screws. The screws, and the extruder itself, may be divided into a number of sections for processing reasons, along the length of the extruder. There may be any suitable number of sections, typically from 1 to 20, or any number therebetween. The processing sections are characterized by different arrangements and spacings of threads and blades along the extruder screw(s). Thread designs for such screws are disclosed in U.S. Pat. No. 5,698,235 to Satoh et al. and U.S. Pat. No. 5,798,077 to Womer et al., both of which are herein incorporated by reference in their entireties.

As a non-limiting example, the extruder may have one or more feed sections, one or more compression sections, one or more melting zones, one or more mixer sections, and mixing zones. A feed section typically begins right under a feed hopper which contains one or more components that may be blended, such as a plastic material in pellet form. The feed zone accepts the feedstock and compacts it into a solid as the screw(s) are rotated. Melting may also begin in this section. The compacted solid material and any liquid melt are conveyed by flights or threads on the screw(s) to the next section.

One or more compression sections or zones may be included to further compress the solid material and squeeze it against a wall of the heated barrel (temperature zones as discussed below) as the screw is rotated. This section is typically formed by a helical channel of variable depth on the screw(s). In many cases, the channel may have a depth at its inlet greater than the depth at its outlet. Typically, the depth of the channel varies linearly from its inlet to its outlet. There may be any number of compression sections spaced along the length of the extruder.

One or more compression sections or zones may be included to further compress the solid material and squeeze it against a wall of the heated barrel (temperature zones as discussed below) as the screw is rotated. This section is typically formed by a helical channel of variable depth on the screw(s). In many cases, the channel may have a depth at its inlet greater than the depth at its outlet. Typically, the depth of the channel varies linearly from its inlet to its outlet. There may be any number of compression sections spaced along the length of the extruder.

One or more melting zones may be included, which may include two parallel channels having a plurality of peaks and a plurality of valleys having the same width. Typically, the peaks in each channel are aligned with the valleys in the other channel so as to enhance the mixing effect. The peaks and valleys in each channel are formed by alternating ascending portions and descending portions of the channel. As material moves through the melting zone, the screw rotates and any solid material is broken up and is melted. There may be any number of melting zones spaced along the length of the extruder.

One or more kneading sections may be included along the length of the extruder. In an embodiment of the present invention, a twin screw extruder is used, and the kneading section includes multi-flight kneading disks mounted in a non-rotary manner on at least part of the length of each shaft. Extruders and extruder screws with suitable kneading disks are disclosed in U.S. Pat. No. 4,824,256 to Härling et al.; U.S. Pat. No. 5,947,593 to Inoue et al.; U.S. Pat. No. 6,048,088 to Härling et al.; U.S. Pat. No. 6,179,460 to Burkhardt et al.; U.S. Pat. No. 6,227,692 to Heathe; and U.S. Pat. No. 6,419,864 to Scheuring et al., all of which are herein incorporated by reference in their entirety.

The screw(s) may also include one or more mixer sections. The mixer section(s) may be formed by a plurality of helical channels of uniform width. Each channel has a depth which gradually decreases from the channel inlet to the channel outlet. The mixer section may be designed to trap solid particles that are larger than the clearance to the barrel wall in one dimension in the melt as the screw rotates, while allowing smaller particles to pass through the clearance between the barrel wall and the outermost dimension of the mixer section. Any material trapped by the mixer section is eventually melted by heat conduction. There may be any number of mixer sections spaced along the length of the extruder.

In an embodiment of the present invention, the design of the screw(s) controls shear during melting and enlarges the heat transfer surface by breaking up compacted solids. This is particularly an advantage when shear sensitive resins are used.

A downstream vacuum may be applied to the extruder to remove volatile materials that may be present in the components of the present extrudable resin composition. Any suitable vacuum may be applied to the extruder. The vacuum may be 100 mm Hg, in some cases 80 mm Hg, in other cases 60 mm Hg, in some situations 40 mm Hg, in other situations 30 mm Hg, during some operations 20 mm Hg, during other operations 15 mm Hg, in particular cases 10 mm Hg, in certain situations 5 mm Hg, and in special cases 1 mm Hg. The amount of vacuum will be an amount sufficient to remove any volatile materials, while not being detrimental to any physical properties of an extruded liner of the extrudable resin composition. The vacuum applied downstream in the extruder may vary between any of the values recited above.

In many cases, the components of the extrudable resin composition are fed to the front end of the extruder. However, in order to provide desirable properties to a liner made from the extrudable resin composition, selected components may be added downstream or further along the extruder from the front end and toward the extruding end. Any of the components of the extrudable resin composition may be added downstream. In an embodiment of the present invention, all or a portion of the reinforcement component may be added downstream. When all or a portion of the reinforcement component is added downstream, the resulting extruded tubular of the extrudable resin composition typically demonstrates improved mechanical properties. Further, addition of all or a portion of the reinforcement component downstream may prevent or minimize fiber breakage.

In an embodiment of the present invention, the extruder has a number of temperature zones along its length. The number of temperature zones and the operating temperatures therein are optimized to provide thorough and uniform mixing of the components to optimize physical and mechanical properties of the resulting extruded tubular of the extrudable resin composition.

Any suitable number of temperature zones may be included along the length of the extruder. There may be 2 temperature zones, in some cases 4 temperature zones, in other cases 6 temperature zones, in some situations 8 temperature zones, in other situations 10 temperature zones, during some operations 12 temperature zones, during other operations 14 temperature zones, in particular cases 16 temperature zones, in certain situations 18 temperature zones, and in certain cases 20 temperature zones. The number of temperature zones along the extruder may vary between any of the values recited above The temperature in each temperature zone may vary independently of each of the other temperature zones along the length of the extruder. Any suitable temperature may be applied in each of the temperature zones. The temperature of any of the temperature zones may be 204° C., in some cases 232° C., in other cases 260° C., in some situations 266° C., in other situations 271° C., during some operations 277° C., during other operations 279° C., in particular cases 282° C., in certain situations 288° C., in certain cases 316° C., often 327° C., in particular situations 343° C., with some materials 371° C., and with other materials as high as 427° C. The temperature in each temperature zone along the length of the extruder may independently vary between any of the values recited above.

As a non-limiting example, when the extrudable resin composition includes PPS, an extruder having 6 temperature zones may be used, where the successive temperature zones are maintained at 260° C., 277° C., 279° C., 279° C., 288° C., and 288° C., respectively. Alternatively, as a non-limiting example, when the extrudable resin composition includes a polyarylketone, an extruder having 6 temperature zones may be used, where the successive temperature zones are maintained at 316° C., 327° C., 332° C., 354° C., 360° C., and 371° C., respectively.

Regardless of the type of extruder employed in the present invention, the screw speed may be varied to provide for desired processing conditions and processing times. As an example, the residence time of the extrudable resin composition in the extruder may be closely controlled due to potential shear and thermal sensitivity. Any suitable screw speed may be applied in the extruder of the present invention. The screw speed may be 300 rpm, in some cases 325 rpm, in other cases 350 rpm, in some situations 375 rpm, in other situations 400 rpm, during some operations 425 rpm, during other operations 450 rpm, in particular cases 500 rpm, in certain situations 525 rpm, in other certain situations 550 rpm, in certain cases 575 rpm, in other certain cases 600 rpm, and with some equipment up to 1,200 rpm. The screw speed is limited by torque and the shear sensitivity of the extrudable resin composition. The screw speed in the extruder may vary between any of the values recited above.

The residence time of the extrudable resin composition in the extruder is controlled to prevent degradation of the extrudable resin composition or any components thereof. Any suitable residence time may be applied in the present invention. The residence time may be 1 minute, in some cases 2 minutes, in other cases 3 minutes, in some situations 4 minutes, in other situations 5 minutes, during some operations 6 minutes, during other operations 8 minutes, in particular cases 10 minutes, in certain situations 12 minutes, in other certain situations 15 minutes, in certain cases 17 minutes, and in other certain cases 20 minutes. The residence time of the extrudable resin composition in the extruder may vary between any of the values recited above.

From the discharge end of the extruder, a pellet is formed. The pellet may be formed from a cold cut process or from a hot cut process. In the cold cut process, the extrudable resin composition strands (from 1 to 15, inclusive) extruded under the above processing conditions are cooled in water or by air and successively cut into pellets with a pelletizer. Suitable pelletizers include, but are not limited to, the 509-E, 147-S, and 124-S models available from Conair Reduction Engineering, Kent, Ohio. The water may be from 16° C. to 49° C., and is typically at ambient conditions. The pelletization dye is typically from 1/8" to 3/16" and the resulting pellets are cylindrical in shape having a diameter of 1/16" to 1/4", typically 1/8" and a length of 1/16" to 1/4", typically 1/8".

In the hot cut process, an extrudate is comminuted immediately after emerging from the die arrangement on the extruder by, for example, rotating knives or another suitable arrangement, expediently into pieces whose length approximately equals the diameter of the extrudate. These cut-off melt particles cool in a stream of air or gas to such an extent that the surface is non-tacky on contact with other particles or a vessel wall but, on the other hand, the particles are still sufficiently plastic to assume a generally spherical shape with a flat side. The substantially spherical particles have a diameter of 1/16" to 1/4", typically 1/8".

The pellets are fed, typically to a single screw extruder equipped with a vacuum sizer to form a substantially cylindrical liner, or tube, as is known in the art, which may be of any suitable length. As a non-limiting example, the extruded liner may be from 20 to 100 feet in length, or any length therebetween.

Liners made from the extrudable resin composition of the present invention in extruders as described above maintain their structural, barrier, and mechanical integrity when exposed to crude oil at temperatures of 221° C. and higher and natural gas at 260° C. and higher. When exposed to a pressure of 15,000 psi and decompressed at a rate of 200 psi/min. to a pressure of 0 psi, no visible physical damage occurs to the liner.

Further, liners made from the extrudable resin composition of the present invention in extruders as described above have good chemical resistance to carbon disulfide, methane, ethane, propane, butane, nitrogen, acetone, toluene, xylene, diesel, chlorine water, hydrochloric acid solution, acetic acid, sulfuric acid solution, nitric acid solution, sodium hypochlorite solution, hydrogen peroxide, sodium hydroxide solution, hydrofluoric acid solution, potassium hydroxide solution, ammonium hydroxide solution, and sour crude oil.

The liners made from the extrudable resin composition of the present invention in extruders as described above may be used to line metal tubulars in downhole tubular applications. The liners also may be used for corrosion protective liners for oil and gas production as well as in line pipe, flow line, and transportation line applications during oil and gas production and supply operations. Additionally, the liners may be used in most any application where corrosion protection is required to transmit or store corrosive fluids, particularly at high temperatures. Some typical examples of such applications include, without limitation, piping in wastewater treatment, chemical plants, slurry pipes, paper mills, agricultural/biological facilities, and electric power plants. The liners of the present invention also may be used to provide thermal insulation in similar corrosive applications. In such applications, they provide excellent protection against corrosion of the tubular.

The liners made from the extrudable resin composition of the present invention will be able to withstand typical hoop stress when used. As used herein, the term "hoop stress" refers to the stress in a pipe wall acting circumferentially in a plane perpendicular to the longitudinal axis of the pipe, and produced by the pressure of the fluid in the pipe. The liners made from the extrudable resin composition of the present invention will withstand hoop stress of at least 100 psi, in some cases at least 200 psi, in other cases at least 300 psi, in some situations at least 400 psi, and in other cases at least 500 psi. Further, the liners made from the extrudable resin composition of the present invention may withstand hoop stress of up to 6,000 psi, in some cases up to 5,000 psi, in other cases up to 4,000 psi, in some situations up to 3,000 psi, and in other cases up to 2,000 psi. The hoop stress that liners made from the extrudable resin composition of the present invention are able to withstand may vary between any of the values recited above.

In an embodiment of the present invention, the high temperature liner has disruption, or anchor, members located on the outer surface of the liner which anchor the liner in a tubular. The disruption members produce a non-smooth surface to the outer wall of the liner. Any suitable disruption member can be used. Suitable disruption members include, but are not limited to, tabs, groove anchor members, holes, or ribs. As shown in FIG. 1, the liner (10) is a substantially cylindrical tube, having a tube wall (12) which extends between a front, or first end, (14) and a back, or second end, (16) of the tube. A plurality of tabs (18) is located on the outer surface of the tube wall (12). FIG. 2 shows a front end (14) of the liner (10) with a plurality of tabs (18) on the outer surface of the tube wall (12). FIG. 3 shows a longitudinal view of the liner (10), taken along line II-II of FIG. 2, in which four tabs (18) are visible on the outer surface of the tube wall (12). As shown in FIG. 4, the tabs (18) have a side wall (20) which is jointly attached at an acute angle to the tube wall (12) of the liner (10). The acute angle provides an undercut area (22) which allows the filler material to surround the tab (18) to provide a radial anchor to a tubular. Attachment or formation of the tabs to the liner wall may be by sonic welding, adhesive, or any other acceptable method.

In another embodiment of the present invention, as shown in FIG. 5, the high temperature liner (10) has at least one rib (24) extending along the longitudinal axis of the tube wall (12) of the liner (10). As shown in FIG. 6, each rib (24) may have at least one groove cut (28) which runs through the rib at an acute angle with respect to the longitudinal axis of the liner (10), thus forming a passageway through the rib (24). FIG. 7 is a cross-sectional view taken along line VI-VI of FIG. 6, showing a plurality of ribs (24). FIG. 8 is a cross-sectional view taken along area VI of FIG. 6, showing a rib (24) and a groove cut (28). Any suitable width of the groove cut (28) may be applied in the present invention. The groove cut may be as small as 1/64", in some cases 1/32", in other cases 1/16", in some situations 1/8", in other situations 1/4", in certain situations 1/2", in other certain situations 1", and in certain cases as wide as 2". The width of the groove cut may vary between any of the values recited above. As shown in FIG. 9, each groove cut (28) has opposing walls (26) in the rib (24), which are jointly located at an acute angle to the tube wall of the liner. The acute angle provides an undercut area (22) necessary to allow the filler material to surround the rib (24) in order to provide a longitudinal anchor to a tubular. The ribs are made from the extrudable resin composition and are extruded with the high temperature engineering thermoplastic.

Figure 11:
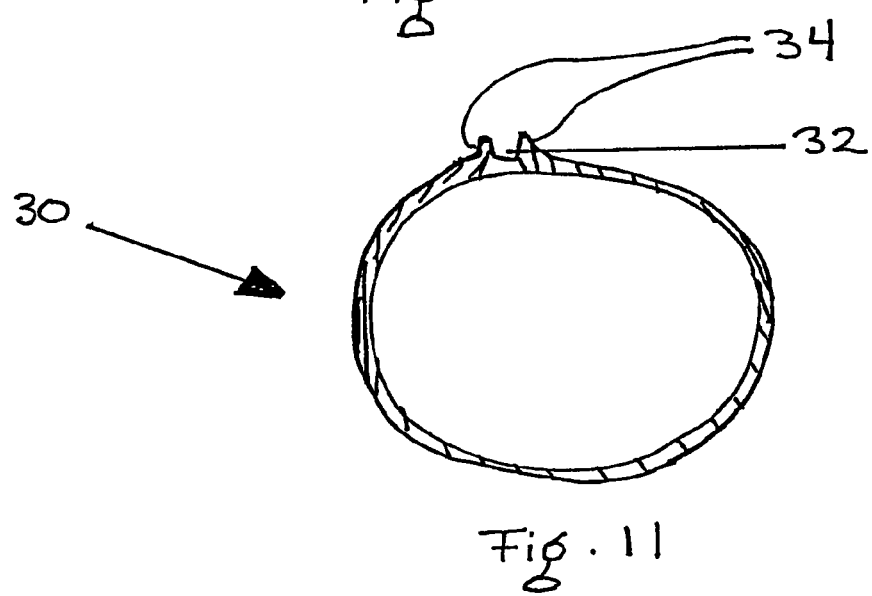
FIG. 11 is a cross-sectional view taken along line X of FIG. 10 of the high temperature liner with a grove anchor member.

In another embodiment of the present invention, as shown in FIGS. 10 and 11, the high temperature liner (10) has at least one groove anchor member (30) comprised of a groove (32) having groove walls (34) on either side of the groove (32), in which the groove walls (34) are located at a higher level than the surface of the liner (10). The groove anchor member (30) is formed using a heat mechanism, such as knurlers, solder irons, or lasers. The heat mechanism melts the liner surface, displacing material to either side of the groove (32) to form the raised walls (34) of the groove (32). The groove anchor member (30) anchors the liner (10) in the tubular. Any heat mechanism which reaches a temperature high enough to melt the high temperature liner can be used to make a surface pattern of the groove anchor member (30). The surface pattern runs along the longitudinal axis of the liner (10) and can include, without limitation, spirals, zig-zags, or any other suitable pattern.

Any suitable acute angle for attachment of the tabs or ribs to the wall of the liner may be applied in the present invention. The acute angle may be 30 degrees, in some cases 35 degrees, in other cases 40 degrees, in some situations 45 degrees, in other situations 50 degrees, in particular cases 55 degrees, and in certain situations 60 degrees. The acute angle of the extrudable resin composition in the extruder may vary between any of the values recited above.

The diameter of the liner will be smaller than the diameter of the tubular in which it will be inserted, creating a space, or annular gap, between the liner and the tubular. The annular gap between the liner and the tubular can be as little as 1 mil, in some cases at least 5 mils, in other cases at least 10 mils, in some situations at least 20 mils, and in other cases at least 50 mils. Further, the annular gap between the liner and the tubular of the present invention may be as high as 80 mils, in some cases up to 70 mils, in other cases up to 60 mils, in some situations up to 50 mils, and in other cases up to 40 mils. The annular gap between the liner and the tubular may vary between any of the values recited above.

The annular gap may be filled with any suitable filler material. Suitable fillers include, but are not limited, to grout, cement, polymers, or blow molding compounds. The filler material can flow around the tabs or ribs of the liner, filling the annular gap between the liner and the tubular and anchoring the tabs or ribs of the liner in the tubular, thus significantly reducing the longitudinal displacement of the liner within the tubular when the liner is undergoing thermal expansion or contraction.

The liners made from the extrudable resin composition of the present invention are able to maintain their integrity during such cementing or grouting operations.

Prior art liners have been known to be susceptible to collapse during installation and decompression cycles. The liners made from the extrudable resin composition of the present invention do not collapse under the stress of typical installation and decompression cycles.

The present invention is more particularly described in the following example, which is intended to be illustrative only, since numerous modifications and variations therein will be apparent to those skilled in the art. Unless otherwise specified, all parts and percentages are by weight.

Example 1

The materials in the table below were blended using a PKV Blender to form Blend

| Material | Weight (kg) |
| --- | --- |
| Fiber Glass[1] | 274.4 |
| $TiO_2$[2] | 55.8 |
| PTFE[3] | 55.8 |

[1]MaxiChop 3790 available from PPG Industries, Pittsburgh, PA
[2]R960 available from E. I. du Pont de Nemours and Company, Wilmington, DE
[3]ZONYL MP 1100 available from du Pont The resulting blend contained 71 wt. % fiber glass, 14.5 wt. % $TiO_2$ and 14.5 wt. % PTFE.

The materials in the table below were blended using a PKV Blender to form Blend 2:

| Material | Weight (kg) |
| --- | --- |
| Mixture from Blend 1 | 19.1 |
| PPS[4] | 23.6 |

[4]FORTRON 0320 available from the Ticona Division of Celanese AG, Frankfurt, Germany The resulting blend contained 55.1 wt. % PPS, 31.9 wt. % fiber glass, 6.5 wt. % $TiO_2$ and 6.5 wt. % PTFE.

A twin screw extruder, ZSK-30 available from Coperion Werner & Pfleiderer, Konstanz, Germany, equipped with two feeders, a 6-inch trough, pelletizer, vacuum pump, microair and vacuum cleaner was used to extrude the resin blend. The extruder was operated at 325 rpm, with a small two-hole die, 70-80% torque, and vacuum with six temperature zones maintained at 260° C., 277° C., 279° C., 279° C., 288° C., and 288° C., respectively.

The feeders contained the following materials:

| Feeder No. | Material |
| --- | --- |
| 1 | PPS Resin[5] |
| 2 | Blend 2 |

[5]FORTRON 0343 available from the Ticona Division of Celanese AG, Frankfurt, Germany Dimensionally stable tubes in 30- to 45-foot lengths were produced that contained minimal to no visible voids. It is possible to extrude an infinite number of liner lengths with this equipment and resin.

The present invention has been described with reference to specific details of particular embodiments thereof. It is not intended that such details be regarded as limitations upon the scope of the invention, except insofar as, and to the extent that they are included in the accompanying claims.

The invention claimed is:

1. An extrudable resin composition, consisting of:
a high temperature engineering thermoplastic compounded with an external lubricant, a polymeric lubricant, and one or more of a reinforcement component and an enhancing filler component, wherein the extrudable resin composition is thermally stable at temperatures of up to about 427° C.; wherein the high temperature engineering thermoplastic is one or more selected from the group consisting of polyarylketones, chemical resistant polysulfones (PSU), polyphenyl sulfones (PPSu), polyether sulfones (PES), polyolefins, and polyarylene sulfides; the external lubricant is one or more selected from the group consisting of fatty acids and their corresponding amides, esters, and salts; and organic phosphate esters; and the polymeric lubricant consists of a fluoropolymer.

2. The composition of claim 1, wherein the high temperature engineering thermoplastic is present in the extrudable resin composition at a level between about 50 to 99.9 wt. %.

3. The composition of claim 1, wherein the reinforcement component is present in the extrudable resin composition at a level between about 0.1 to 40 wt. %.

4. The composition of claim 1, wherein the enhancing filler component is present in the extrudable resin composition at a level between about 0.01 to 10 wt. %.

5. The composition of claim 1, wherein the polymeric lubricant is present in the extrudable resin composition at a level between about 0.001 to 5 wt. %.

6. The composition of claim 1, wherein the external lubricant is present in the extrudable resin composition at a level between about 0.001 to 2 wt. %.

7. The composition of claim 1, wherein the high temperature engineering thermoplastic is one or more polyarylketones selected from the group consisting of: polyether ether ketones (PEEK), polyether ketones (PEK), and polyether ketone ketones (PEKK).

8. The composition of claim 1, wherein the polyarylene sulfide consists of polyphenylene sulfide (PPS).

9. The composition of claim 7, wherein the polyarylketone consists of polyether ether ketones (PEEK).

10. The composition of claim 7, wherein the polyarylketone consists of polyether ketones (PEK).

11. The composition of claim 7, wherein the polyarylketone consists of polyether ketone ketones (PEKK).

12. The composition of claim 7, wherein the polyarylketone has a melt index (MI) up to about 200 g/10 min. measured at 204° C. and 8.4 Kg.

13. The composition of claim 8, wherein the polyphenylene sulfide has an MI up to about 200 g/10 min. measured at 320° C. and 3.7 Kg.

14. The composition of claim 7, wherein the polyarylketone, has a 6 minute to 30 minute (6/30) MI ratio of between about 0.1 to 1.

15. The composition of claim 14, wherein the 6/30 MI ratio is about 1.

16. The composition of claim 8, wherein the polyphenylene sulfide has a 6 minute to 15 minute (6/15) MI ratio of between about 0.1 to 1.

17. The composition of claim 16, wherein the 6/15 ratio is about 1.

18. The composition of claim 3, wherein the reinforcement component is one or more selected from inorganic fibers, glass fibers, carbon fibers, graphite, ceramic fibers, and polymeric fibers.

19. The composition of claim 18, wherein the inorganic fiber is glass fiber.

20. The composition of claim 4, wherein the enhancing filler component is one or more selected from titanium dioxide, barium sulfate, silica, alumina, talc, mica, kaolin, clay, silica-alumina, calcium carbonate, calcium silicate, calcium phosphate, calcium sulfate, magnesium carbonate, magnesium oxide, zinc oxide, magnesium phosphate, silicon nitride, glass, hydrotalcite, and zirconium oxide.

21. The composition of claim 20, wherein the enhancing filler component is a mineral oxide present between about 15 to 25 wt. %.

22. The composition of claim 5, wherein the fluoropolymer is a polymer consisting of one or more monomers selected from the group consisting of tetrafluoroethylene, trifluoroethylene, vinylidene fluoride, chlorotrifluoroethylene, and fluorinated alkyl esters of (meth) acrylic acid.

23. The composition of claim 6, wherein the external lubricant is present in the extrudable resin composition at a level between about 0.01 to 1.9 wt. %.

24. The composition of claim 1, wherein the fatty acids include one or more selected from the group consisting of myristic acid, palmitic acid, stearic acid, arachic acid, montanic acid, octadecenoic acid, and parinaric acid.

25. The composition of claim 1, wherein the fatty acid esters are selected from fatty acids esterified with one or more hydroxyl containing compounds selected from the group consisting of glycerol, ethylene glycol, propylene glycol, pentaerythritol and $C_1$ to $C_{24}$ alkylols.

26. The composition of claim 1, wherein the fatty acid amides are selected from fatty acids that have undergone an amidation reaction with one or more amine containing compounds selected from the group consisting of $C_1$ to $C_{24}$ primary amines, $C_1$ to $C_{24}$ secondary amines, methylene bisamines, ethylene bisamines and alkanolamines.

27. The composition of claim 1, wherein the fatty acid amides are one or more selected from palmitic acid amides, stearic acid amides, oleic acid amides, and N,N'-ethylenebisstearamide.

28. The composition of claim 1, wherein the fatty acid salts include one or more fatty acid salts of an ion selected from the group consisting of calcium, magnesium, zinc, and cadmium.

29. The composition of claim 1, wherein the high temperature engineering thermoplastic has a heat deflection temperature of at least 121° C.

30. An extrudable resin composition, consisting of:
50 to 99.9 wt. % of a high temperature engineering thermoplastic consisting of one or more polyphenylene sulfides;
0.1 to 40 wt. % of a reinforcement component consisting of glass fiber;
0.01 to 10 wt. % of an enhancing filler component consisting of titanium dioxide;
0.001 to 5 wt. % of a polymeric lubricant consisting of polytetrafluoroethylene; and
0.001 to 2 wt. % of an external lubricant selected from the group consisting of calcium stearate, zinc stearate, palmitic acid amides, stearic acid amides, oleic acid amides, and N,N'-ethylenebisstearamide, wherein the extrudable resin composition maintains its form and function at temperatures up to about 232° C., and further wherein the high temperature engineering thermoplastic has a heat deflection temperature higher than about 121° C.

31. An extrudable resin composition, consisting of:
50 to 99.9 wt. % of a high temperature engineering thermoplastic consisting of one or more polyphenylene sulfides;
15 to 25 wt. % of an enhancing filler component consisting of mineral oxide;
0 to 5 wt. % of a polymeric lubricant consisting of polytetrafluoroethylene; and
0.001 to 2 wt. % of an external lubricant selected from the group consisting of calcium stearate, zinc stearate, palmitic acid amides, stearic acid amides, oleic acid amides, and N,N'-ethylenebisstearamide, wherein the extrudable resin composition maintains its form and function at temperatures up to about 232° C., and further wherein the high temperature engineering thermoplastic has a heat deflection temperature higher than about 121° C.

* * * * *

UNITED STATES PATENT AND TRADEMARK OFFICE
CERTIFICATE OF CORRECTION

| | | |
|---|---|---|
| PATENT NO. | : 8,129,462 B2 | Page 1 of 1 |
| APPLICATION NO. | : 10/524897 | |
| DATED | : March 6, 2012 | |
| INVENTOR(S) | : Tim Hsu et al. | |

It is certified that error appears in the above-identified patent and that said Letters Patent is hereby corrected as shown below:

Title Page of Patent, Column 1, insert -- Related U.S. Application Data
(60) Provisional application No. 60/404,573, filed on Aug. 19, 2002. --

Signed and Sealed this
Twenty-ninth Day of May, 2012

David J. Kappos
*Director of the United States Patent and Trademark Office*